United States Patent [19]

Musto et al.

[11] 4,432,648

[45] Feb. 21, 1984

[54] MULTIPLE DIMENSION LASER GAUGE

[75] Inventors: Dominick J. Musto, Middlesex; Harold Lerner, Fort Lee, both of N.J.

[73] Assignee: The Austin Company, Cleveland, Ohio

[21] Appl. No.: 264,477

[22] Filed: May 18, 1981
(Under 37 CFR 1.47)

[51] Int. Cl.³ .................. G01B 11/02; G01B 11/08
[52] U.S. Cl. .................................. 356/387; 250/224
[58] Field of Search .................. 356/380, 386–387, 356/398, 250/224, 560

[56] References Cited

U.S. PATENT DOCUMENTS

| | | | |
|---|---|---|---|
| 3,841,766 | 10/1974 | Walter | 356/398 |
| 3,870,890 | 3/1975 | Binks et al. | 356/387 |
| 4,201,476 | 5/1980 | Musto et al. | 356/386 |
| 4,203,673 | 5/1980 | Buckson | 250/224 |
| 4,208,589 | 6/1980 | Dashwood et al. | 250/560 |

FOREIGN PATENT DOCUMENTS 239578 of 1969 U.S.S.R. ........................ 356/375

*Primary Examiner*—William H. Punter

*Attorney, Agent, or Firm*—Pearne, Gordon, Sessions, McCoy, Granger & Tilberry

[57] ABSTRACT

A laser gauge utilizing a parabolic mirror projects a plurality of laser beams parallel to the principal axis of the parabolic mirror. A plurality of reflector means, e.g., three reflector means, are established in front of the parabolic mirror and are positioned to reflect the laser beams into a plurality of groups of paths at different angles to scan across the object to be measured. Photodetector means is mounted to receive the laser beams after scanning of the multiple dimensions of any such object. Output means, including a microprocessor, is connected to receive the output of the photodetector means to determine the dimension along a plurality of crosssectional dimensions of any object in the groups of paths. When three such groups of paths are used, they may be at 120 degrees each with respect to the other to measure the cross sectional dimension of the object at three different places. The foregoing abstract is merely a resume of one general application, is not a complete discussion of all principles of operation or applications, and is not to be construed as a limitation on the scope of the claimed subject matter.

10 Claims, 5 Drawing Figures

MULTIPLE DIMENSION LASER GAUGE

BACKGROUND OF THE INVENTION

Attempts have been made in the past to utilize laser or light gauges to determine two mutually perpendicular cross-sectional dimensions of an elongated workpiece, for example, as shown in U.S. Pat. No. 3,870,890. The laser beam is projected onto a rotating mirror and then a long path to the object is folded by mirrors to provide a smaller physical size of gauge. The beams are spread out by mirrors into two separate paths, and then passed through lenses to establish substantially parallel laser beams which scan across the object in two mutually perpendicular directions. The laser beams then pass through two additional lenses and a long path length is folded by additional mirrors to impinge on two separate photocells. The time of scanning across a workpiece is measured and the first and second dimensions are determined from such first and second scanning times.

U.S. Pat. No. 3,461,299 utilizes four plane mirrors and a light source illuminating an object with a photocell covered by an enclosure having a slit and the enclosure rotates to be illuminated by a light beam directly past the object or reflected off the mirrors. Such system is alleged to be sensitive enough to detect the difference between one object and two objects.

U.S. Pat. No. 3,787,700 has two linear arrays to scan the diameter of a log along two dimensions perpendicular to each other and using a lens system together with an accurately known distance between the linear arrays and the object to be measured.

U.S. Pat. No. 3,997,269 shows measurement of the diameter of a log along two dimensions perpendicular to each other. Each measurement is made by a separate parabolic mirror and the time for a scan across the diameter of the log is determined by a clock frequency. This clock frequency is varied in a step fashion or, alternatively, is infinitely varied by a cam in order to correct for the inherent nonlinearity caused by the parabolic mirror.

U.S. Pat. No. 4,201,476 shows a laser dimension gauge capable of determining a single dimension of a given cross section of a bar workpiece, and utilizing a parabolic mirror and retroreflective surface.

SUMMARY OF THE INVENTION

The problem to be solved, therefore, is how to construct a multiple dimension gauge which can measure the cross sectional dimension of an object along two different directions, do the measuring accurately, as well as quickly, and be a noncontacting gauge so that the object may be one which is moving or hot or in a hostile environment. This problem is solved by a light gauge for noncontact measuring of two different dimensions of an object comprising, in combination, a parabolic mirror having a focal point along the principal axis of the mirror, scannable means including means substantially at said focal point mounted to scan said parabolic mirror to cooperate with a plurality of light beams extending from said parabolic mirror parallel to said axis, reflector means having at least part thereof established in front of said parabolic mirror and positioned to establish the light beams in at least first and second groups of paths to scan the object to be measured, said at least first and second groups of paths being adjacent and non-overlapping photodetector means mounted to receive the light beams from said first and second groups of paths after scanning of two different dimensions of any said object, output means connected to receive the output of said photodetector means, means actuated in accordance with said scannable means to determine the position thereof and having an output to said output means, and said output means including means to determine the dimension along two different directions of any object in said groups of paths.

Accordingly, an object of the invention is to provide accurate measurements of two or three different dimensions of an object.

Another object of the invention is to provide a light gauge with the ability to measure more than one dimension of an object and utilizing a reference beam to accurately determine the position of the object relative to a parabolic mirror in the light gauge.

Other objects and a fuller understanding of the invention may be had by referring to the following description and claims, taken in conjunction with the accompanying drawing.

DESCRIPTION OF THE PREFERRED EMBODIMENTS

Figure 1:
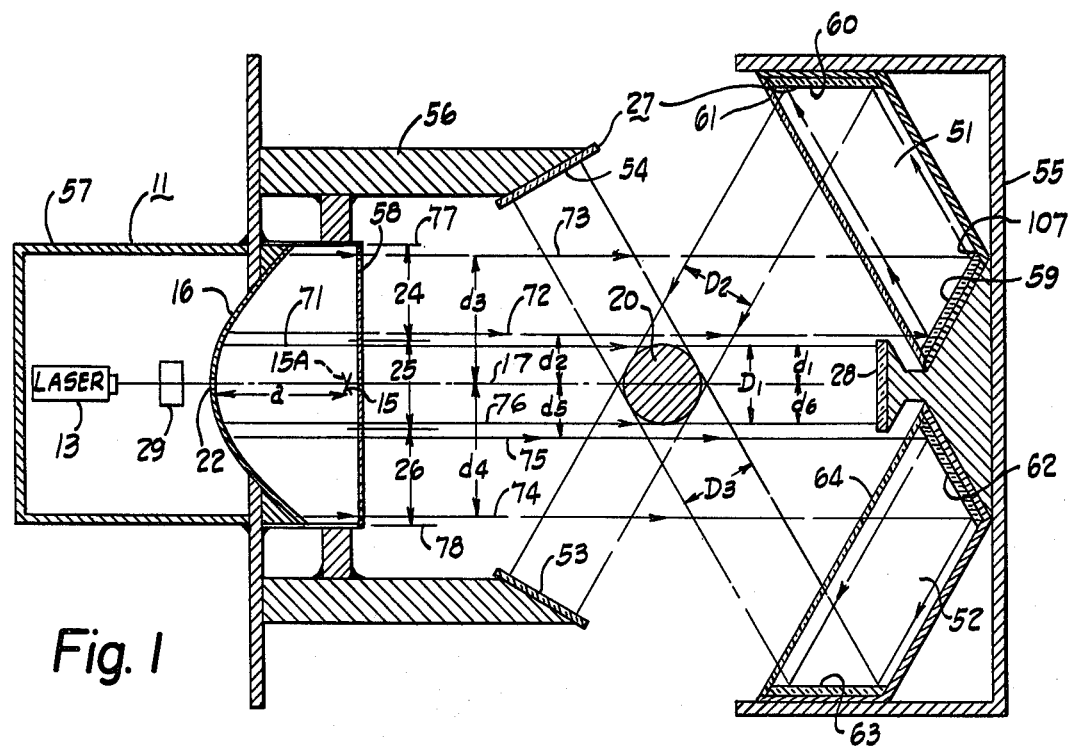
FIG. 1 is an elevational view of the light gauge incorporating the invention.
Figure 2:
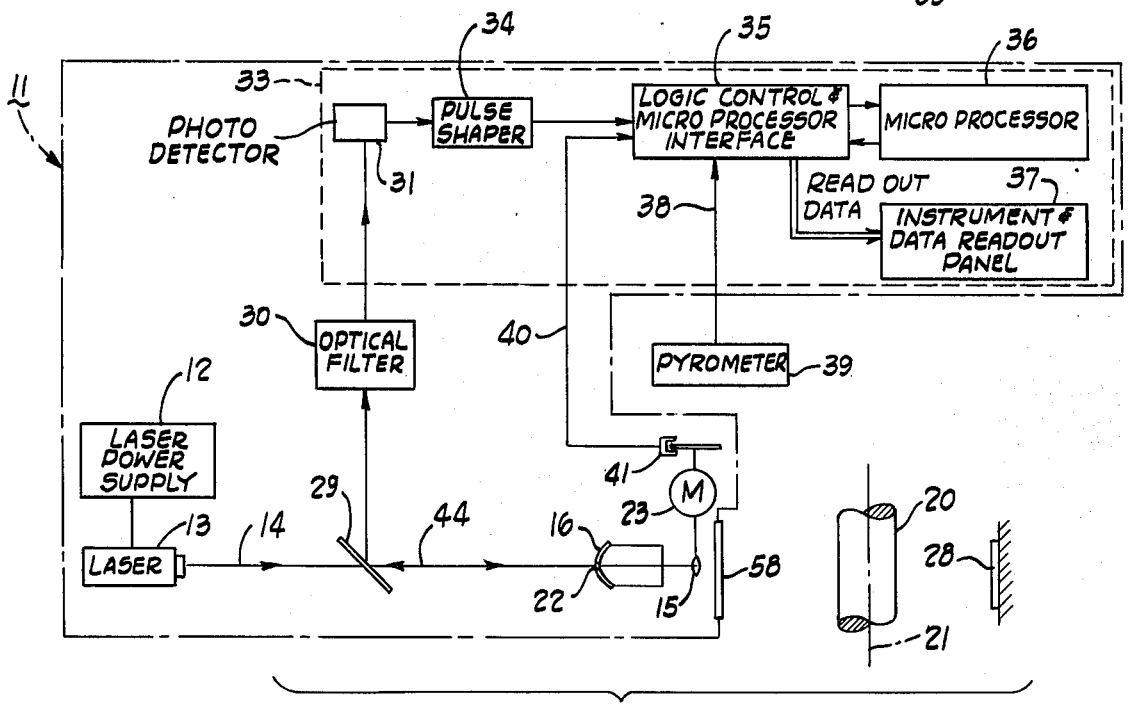
FIG. 2 is a plan view of the light gauge of FIG. 1, and incorporating a block circuit diagram.

FIGS. 1 and 2 show a light gauge 11 wherein a power supply 12 supplies electrical power to a light source shown as a laser 13, which may be of many different types, but one satisfactory type is a helium-neon laser emitting a laser beam 14. This laser beam 14 is scanned by scannable means 15 onto a parabolic reflector 16. The scannable means is provided to scan the laser beam along the reflective surface of the parabolic reflector 16 so that parallel rays are emitted from this parabolic reflector parallel to the principal axis 17 of this reflector. These parallel rays are directed toward a workpiece 20 so that the laser gauge 11 may determine that dimension of this workpiece which is perpendicular to the axis 17. Preferably, the reflector axis 17 intersects the axis 21 of the workpiece 20, but, as shown below, this is not mandatory.

The scannable means 15 is positioned at the focal point of the parabolic reflector 16 so as to sweep or scan the surface of the parabolic reflector 16. The laser 13 is positioned so that laser beam 14 impinges on the scannable means 15. In so doing, the preferred mounting is that the laser beam 14 is in the plane of the paper of FIG. 2, and, as shown in both FIGS. 1 and 2, the preferred construction is one wherein the laser beam 14 is coincident with the reflector axis 17. In order to have this laser beam 14 coincident with axis 17, the laser beam 14 passes through a small aperture 22 in the parabolic reflector 16. This aperture 22 is along this axis 17. The scannable means 15 is pivotable so that it is capable of being pivoted to various angles so that the laser beam 14 reflected from the mirror will sweep the entire front surface of this parabolic reflector 16. In the preferred embodiment, the scannable means is a rotatable front surface mirror rotated by a motor 23. The parabolic reflector 16 may be a plane parabolic reflector but in the preferred embodiment is a thin slice of a paraboloid of revolution in order to maintain the laser beam 14 with a minimum of angular beam spread.

The rotatable mirror 15 causes the laser beam to scan the parabolic reflector 16 to cooperate with a plurality of light beams extending from the parabolic mirror 16 parallel to the axis 17.

Reflector means 27 having at least part thereof in front of the parabolic reflector 16 is positioned to establish the light beams in at least first and second groups of paths 24 and 25, respectively, to scan the object to be measured. In this embodiment, a third group of beam paths 26 is also shown. One part of the reflector means 27 is retroreflective tape 28. This may be a commercially available flexible tape on which a multitude of very tiny partially silvered glass beads are adhered. The property of this retroreflective tape is such that it does not obey the normal laws of reflection wherein the angle of incidence equals the angle of reflection; instead, the laser light is reflected immediately back along the laser beam path parallel to axis 17. The rotatable mirror 15 will be at a first angular position to pass a beam on one side of the workpiece 20, and mirror 15 will respond to this laser beam reflected from the tape 28. The motor 23 rotates the motor at some suitable speed, e.g., three revolutions per second, and due to the speed of light, the mirror 15 appears to be standing still so that the light reflected from the retroreflective tape 28 will be reflected by the mirror 15, through the aperture 22 to a beam splitter 29.

When the rotatable mirror 15 is in the dotted line position 15A, this will be a second position thereof to establish the laser beam immediately adjacent the opposite side of the workpiece 20. Again, the laser light will be reflected by the retroreflective tape 28, by the parabolic mirror 16, by the rotatable mirror 15 in the second position 15A thereof to the beam splitter 29. This beam splitter may be of any suitable type, for example, a partially silvered mirror to reflect part of the light through an optical filter 30. This optical filter will be one which is practically transparent to the color of the laser light, yet is relatively opaque to the ambient illumination. In many industrial applications, the ambient illumination is from fluorescent or mercury arc lights which have light predominantly in the blue and green portions of the visible spectrum. With the helium-neon laser having a coherent light confined to the wave length of 632.8 nanometers, this red light is readily passed by the optical filter 30 to a photodetector 31 in an electrical circuit 33. From the photodetector 31 an electrical signal in accordance with the received laser light is passed to a pulse shaper 34 to form a square wave pulse from the signal of the detector 31. The signal is then fed to a logic control and microprocessor interface circuit 35 and a microprocessor 36. The circuit 33 includes an instrument and data readout panel 37 and may also include an input 38 from a pyrometer 39. The logic control circuit 35 also has an input 40 from a rate sensor or angle resolver 41.

The rate sensor 41 is a means which is connected to the scannable means 15 and actuated in accordance therewith to determine the position of this scannable means, especially at the first and second positions thereof, which establish the laser beam on each side of the object 20. The electrical circuit 33 is an output means which determines the dimension of the workpiece 20 which is perpendicular to the axis 17.

A feature of the invention is that reference means 44 includes means establishing a reference line provided relative to the laser beams on each side of object 20 for determining first and second partial dimensions of the workpiece 20. These two partial dimensions, when algebraically combined, give the total dimension of the workpiece 20 which is perpendicular to the parabolic reflector axis 17. In the preferred embodiment, this reference means 44 is a reference beam which is reflected by the rotatable mirror 15 when it is in a reference position. As shown, this reference position is when the rotatable mirror 15 is perpendicular to the parabolic reflector axis 17 so that the laser beam 14 is reflected back along the path of this laser beam 14 and is partially reflected by the beam splitter 29. When received at the photodetector 31, this provides a reference pulse 45, FIG. 3. As shown in this FIG. 3, the reference pulse 45 occurs at time zero corresponding to the 0 degree reference angle of the rotatable mirror 15 at this instant of time. For the first small change in angular position of the mirror 15, the laser light reflected from the mirror 15 and parabolic reflector 16 will strike the workpiece 20 so that none will be reflected to the photodetector 31. When the mirror 15 is in the position shown in FIG. 1, then the laser light beam will just pass the upper edge of workpiece 20. The photodetector 31 then has a first pulse 71A, FIG. 3, applied to it.

A feature of the present invention is that the light beam gauge is capable of measuring two different dimensions of an object 20. The reflector means 27 includes not only the retroreflective tape 28, but also includes first and second prism means 51 and 52 and retroreflectors 53 and 54. The first and second prism means 51 and 52 are fixedly secured in a housing 55, which also supports the retroreflective tape 28. This housing 55 is positioned on the side of the object 20 opposite the parabolic reflector 16. The retroreflectors 53 and 54 are supported on arms 56 fixed to the laser gauge 11. The laser gauge 11 may be mounted in a housing 57 having a transparent window 58 in order to protect the laser gauge 11 and the electrical circuit 33 from any hostile environment.

The first prism means 51 may be a solid prism where small objects are to be scanned; however, in one gauge constructed in accordance with the present invention, the parabolic reflector 16 had a throat aperture of about 22 inches, and hence the first and second prism means 51 are constructed from first and second front surface mirrors 59 and 60, with a clear glass cover 61 to protect such front surface mirrors. The second prism means 52 is similarly constructed with front surface mirrors 62 and 63 protected by the clear glass cover 64.

The reflector means 27 establishes first and second groups of paths 24 and 25, respectively, of light beams disposed along two different directions relative to the object 20. These first and second groups of paths scan two different dimensions of such object 20. As shown in FIG. 1, the parabolic mirror 16 has first, second, and third groups of paths 24, 25, and 26, respectively, all parallel to the principal axis 17. The first group of paths 24 is reflected by the mirrors 59 and 60 in the first prism means 51 so that they scan the object 20 at a 120° angle relative to the scan of the object by the second group of beam paths 25. The third group of beam paths 26 are reflected by the mirrors 62 and 63 to scan the object 20 at a 240° angle relative to the scan of the object by the second group of beam paths 25. This permits measurement of dimensions of the object 20 at three different places, each perpendicular to the respective first, second, and third groups of beam paths.

OPERATION

Figure 3:
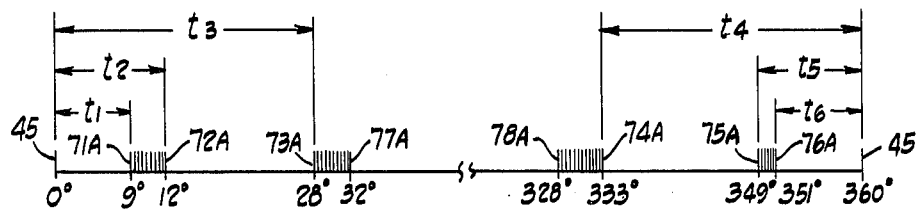
FIG. 3 is a graph of output signal versus angle of the scanning mirror.

In one light beam gauge 11 constructed in accordance with the invention, the throat of the parabolic reflector 16 was about 22 inches, and the focal length a was about 10 inches. In such case, the gauge is capable of measuring three different dimensions of an object 20, which is about a maximum of 7 inches in diameter. Each of the beam paths 24, 25, and 26 is substantially equal in width, namely, slightly over 7 inches in width. The sum of the widths of all these beam paths equals the width of the throat of the parabolic reflector 16 because they are adjacent and non-overlapping. As shown in FIG. 3, the reference pulse 45, which is caused by the laser beam 14 reflected back along the path of the laser beam by the scannable mirror 15 at a 0° angle, occurs at time zero corresponding to this 0° reference angle. For the first small clockwise change in angular position of the mirror 15, the laser light reflected from the mirror 15 and parabolic reflector 16 will strike the workpiece 20, so that none will be reflected to the photodetector 31. When the mirror 15 is in the first position shown in FIG. 1, then a first beam 71 will be established in the second group of beam paths 25, with this light beam 71 just clearing the upper edge of the workpiece 20. The photodetector 31 then has a first pulse 71A (FIG. 3) applied to it. The photodetector 31 then receives light continuously until a second beam 72, reflected by the prism means 51 and retroreflectors 53, just passes the edge of the workpiece 20 in the first group of beam paths 24. This will establish a pulse 72A in FIG. 3.

From then on as the rotatable mirror 15 rotates clockwise, the light beams will be reflected by the prism 51 and will strike the object 20 so that they will not be reflected back to the parabolic reflector 16. Accordingly, the photodetector 31 will not receive light until a third beam 73 in the first group of paths 24 from the reflector 16, as reflected by the prism 51, just passes the edge of the object 20 and is reflected by the retroreflector 53 to the parabolic reflector 16 and to the photodetector 31. This establishes a third pulse 73A, shown in FIG. 3. The photodetector 31 then receives light continuously until the rotatable mirror 15 has rotated clockwise to a point whereat the laser beam no longer strikes the parabolic reflector 16. This termination of the light on the photodetector 31 is not significant, as discussed below. This last pulse is a pulse 77A, caused by a beam 77. From this time on, the photodetector 31 goes dark for a long period of time as the mirror scans the laser beam so that it does not strike the parabolic reflector for an arc something in the order of 280°.

When the scanning mirror 15 is in a position such that it again strikes the parabolic reflector 16 in the third group of paths 26, it establishes a beam 78. This establishes a pulse 78A, again having no significance in determining the diameter or cross sectional dimension of the object 20. When the mirror is in position to establish a fourth beam 74 in the third group of paths 26, this establishes a fourth pulse 74A from the photodetector 31, and this is when the beam 74 just passes one edge of the object 20 by being reflected by the prism 52. Next, the photodetector 31 is not illuminated as the scannable means 15 scans across the object 20 as reflected by the prism 52. When the position of mirror 15 is such that a fifth beam 75 is established in the third group 26, then the laser beam just passes the other edge of object 20 as reflected by prism 52. This establishes the pulse 75A and light continues to fall on the photodetector until the sixth pulse 76A is established by a sixth beam 76, which just passes the lower edge of object 20, which is a beam in the second group of paths 25. When the rotatable mirror 15 has completed 360 degrees of rotation, then another reference pulse 45 is established to again start the cycle.

FIG. 3 indicates times $t_1$ to $t_6$ and $t_1$ is the time between the reference pulse 45 and the first pulse 71A. The time $t_6$ is the time from the sixth pulse 76A to the reference pulse 45. The rate sensor 41 supplies information to the logic control circuit 35 to determine these times $t_1$ and $t_6$. This time is related to the angular position $\phi$ of the rotating mirror 15. Mathematical analysis relates the angular position of the rotatable mirror to the upper partial dimension $d_1$ as follows:

$$d_1 = 2a \tan \phi_1, \quad (1)$$

where $d_1$ = the distance of the beam path 71 to the parabolic reflector axis 17, a = the focal length of the parabolic mirror 16, and $\phi_1$ = the angular position of the rotatable mirror 15. As the rotatable mirror 15 continues to scan in a clockwise direction as viewed in FIG. 1, it achieves the angular position 15A corresponding to the angular position $\phi_2$ that corresponds to the lower partial dimension $d_6$. This distance can be computed by equation 2:

$$d_6 = 2a \tan \phi_2, \quad (2)$$

where $d_6$ = the distance of the beam path 76 to the parabolic reflector axis 17.

The total transverse dimension $D_1$ of the workpiece as measured by the second group of paths 25 is measured in two parts: first $d_1$ is measured, then $d_6$. The overall dimension is computed by algebraically combining $d_1$ and $d_6$, namely, an algebraic summation:

$$D_1 = d_1 + d_6,$$

where $D_1$ equals the transverse dimension of the workpiece 20. The FIG. 1 shows that $d_1$ and $d_6$ are unique distances. The transverse dimension of the workpiece 20 can be accurately measured regardless of how it is aligned with respect to the laser gauge 11. It is not necessary that the axis 17 of the parabolic reflector 16 be aligned to intersect the axis 21 of the workpiece 20. This feature provides an intrinsic advantage of the laser gauge 11 over other prior art devices.

The transverse dimension $D_2$ of the object 20 as measured by the first group of beam paths 24 is determined by the two beams 72 and 73. These establish the two partial distances $d_2$ and $d_3$, respectively, relative to the parabolic reflector axis 17. As shown in FIG. 3, these establish times $t_2$, and $t_3$ of the pulses 72A and 73A relative to the reference pulse 45. Again, the angular position of the rotatable mirror determines these two dimensions $d_2$ and $d_3$ as being two times the focal length of the tangent of the angle of the mirror 15, which establishes the respective beams 72 or 73. In this case, however, it will be apparent from FIG. 1 that the cross sectional dimension of the workpiece 20 is determined by subtracting dimension $d_2$ from dimension $d_3$. Both of these angles of the mirror will be small positive, acute angles relative to the zero angle of the mirror. Hence, both tangent functions will be positive numbers and the difference $D_2$ will be a positive number.

The third group of beam paths 26 includes the beams 74 and 75, which determine the cross sectional diameter $D_3$ of the workpiece 20 perpendicular to such beams, which just pass the edge of the workpiece. As stated above, these establish the pulses 74A and 75A. As shown in FIG. 3, these establish the times $t_4$ and $t_5$, with time $t_4$ being the time between pulse 74A and the reference pulse 45 and time $t_5$ being the time between pulse 75a and the reference pulse 45. Again, the cross sectional dimension $D_3$ of object 20 is determined by the difference between partial dimensions $d_4$ and $d_5$ which again are determined by two times the focal length times the tangent of the angle of mirror 15, which angle establishes the beams 74 and 75.

The rate sensor 41 may be any of several commercially available units; for example, it may be apertures in a disc rotated by the motor 23 with the rate sensor 41 obtaining a digital pulse signal in accordance with the presence or absence of such apertures. This will obtain a pulse for a particular angular displacement of the disc. Because of the reference beam 44, the logic control circuit 35 and microprocessor 36 have a reference point so that the time $t_1$ on FIG. 3 will accurately indicate the angular position of the mirror 15 at the time the first laser beam 71 is established. By using the formula 1 above, the distance $d_1$ is accurately determinable. Also, the time $t_6$ in FIG. 3 is accurately determinable between the time of the establishment of the sixth laser beam 76 and the next reference beam pulse 45. This permits an accurate determination of the distance $d_6$. The summation of these two partial dimensions gives the total dimension $D_1$.

In a similar manner, the rate sensor 41 is utilized to estabish the times $t_2-t_5$, and from this the distances $d_2-d_5$ are determined for the other two cross sectional dimensions of the object 20.

The application of electronics and a microprocessor 36 converts the optically parallel beam generation to an electronic signal that converts the angular position of the mirror to a distance measurement. The system is high speed in that rapid algebraic summations of $d_1$ and $d_6$ can be made and displayed on a numeric indicator 37 as the diameter $D_1$. Diameters $D_2$ and $D_3$ are also displayed on panel 37. The entire laser 13, optics and electrical circuit 33 may be contained within the housing 57 having the transparent window 58 in front of the port of the parabolic reflector 16. This housing 54 may be cooled, for example, water cooled, in order to protect the entire laser gauge from heat or other hostile environments.

A particular application of the laser gauge is the measuring of hot steel forged bars (such as the workpiece 20) while they are being forged. The pyrometer 39 measures the actual temperature of the workpiece 20 and therefore the microprocessor would be able to calculate the "cold" dimension of the workpiece 20 from the hot dimension; the temperature coefficient of expansion and the temperature. The cooled environment of the laser gauge 11 within the housing 54 assures the accuracy of the measurements by keeping the parabolic reflector 16 at a uniform cool temperature.

A wide variety of static measurements can be made with the laser gauge 11. These include round diameters, squares or rectangles, hole sizes, tapers and stepped shapes. The orientation of the piece under measurement is not critical, since all distance measurements are made in two steps related to the axis 17 of the parabolic reflector, not related to the axis 21 of the workpiece 20.

Dynamic measurements are a particular feature of the present invention. The high speed measurement capability of the laser gauge 11 permits measurement of the dimension of the workpiece in dynamic motion. If the workpiece 20 is vibrating, the laser gauge 11 can measure its deviation from the parabolic reflector axis 17. These measurements can be stored in the memory of the microprocessor 36 and displayed as a graph or a printout that shows the displacement of the piece as it vibrates.

As stated above, it is not essential that the parabolic reflector axis 17 intersect the workpiece axis 21. This permits the accurate non-contact gauging of a workpiece without accurate alignment of the gauge relative to the workpiece.

On FIG. 3, some angles have been indicated as an example of positions of the mirror at which the various pulses 71A–76A occur. It will be noted that the pulse 71A occurs at 9° and the pulse 76A occurs at 351°, or a 9°. The tangent of 9° is 0.1584, and if we assume as an example that the focal length a is equal to 10 inches, then according to formula (1), 20 times 0.1584 equals 3.168 inches for each of $d_1$ and $d_2$. This makes $D_1$ equal to the sum of these, or 6.336.

To calculate $D_2$, the distances $d_2$ and $d_3$ are calculated. The tangent of 12° is 0.2126, and the tangent of 28° is 0.5317, which yields $D_2=6.382$ inches. In a similar manner, to calculate $D_3$, utilizing dimensions $d_4$ and $d_5$ and the angles of $-11°$ and $-27°$, the tangents of which are respectively 0.1944 and 0.5095, the dimension $D_3$ equals 6.302. This illustrates the nonlinearity of the dimensions measured at different locations along the surface of the parabolic reflector 16. This nonlinearity follows a tangent function and shows that a greater angular swing is required near the parabolic reflector principal axis 17 than near the outer edges thereof in order to obtain the same scanning dimension. Both dimensions $D_2$ and $D_3$ have a difference therebetween of 16° between the beams establishing these dimensions, yet the two measured dimensions are different by 0.080 inch. The dimension $D_2$ is larger than the dimension $D_1$, yet it is measured by beams having an angular difference therebetween of only 16° compared to mirror positions for $D_1$ having an angular difference of 18°.

Figure 5:
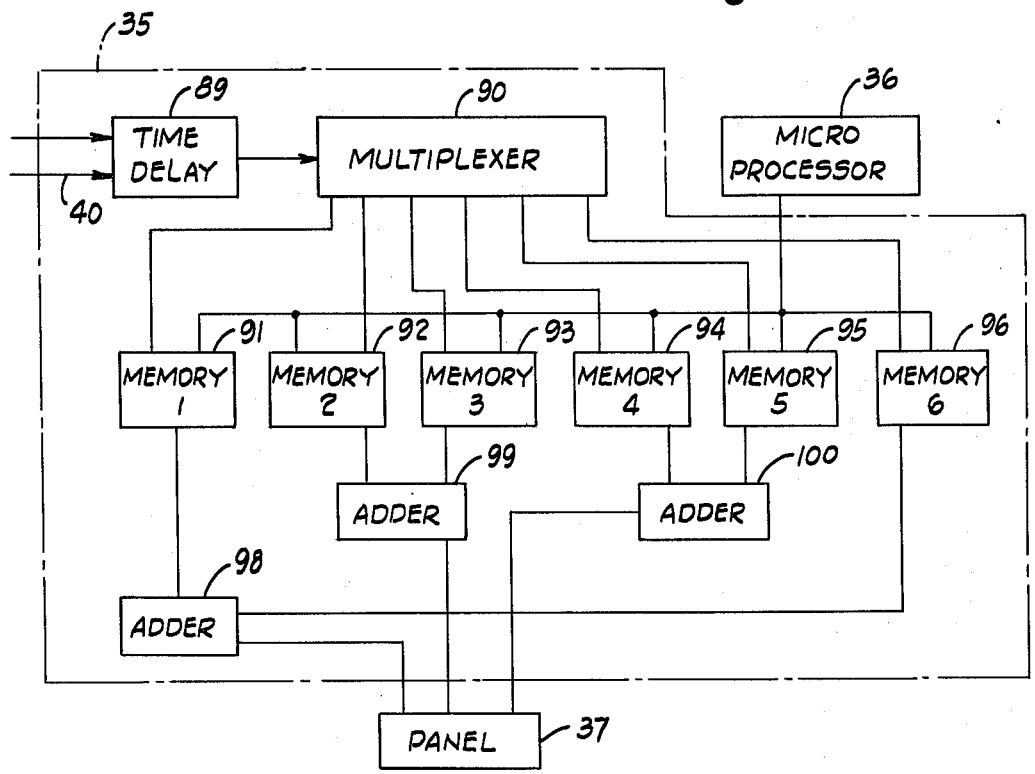
FIG. 5 is a circuit diagram of the logic control circuit of FIG. 2.

FIG. 5 illustrates some of the components in the logic control and microprocessor interface unit 35. This unit 35 includes a time delay circuit 89 supplying a multiplexer 90, in turn supplying an output to first through sixth memory storage units 91–96, respectively. The time delay unit 90 indicates that if the photodetector 31 is not illuminated for a period of time longer than 90 degrees, then the pulse count from the rate sensor is disregarded. Therefore, this is the circuit which ignores the long non-illuminated period between angle 32° and angle 328°, for example, in FIG. 3. Each of the six different angles is stored in each of the six memory devices 91–96. The outputs of the first through sixth memory units 91 to 96 are operated on by the microprocessor 36 to calculate the tangents of each of these six angles. The tangents of the first and sixth angles, times a constant proportional to the focal length, are combined in an adder 98 in order to combine tangents of the angles establishing $d_1$ and $d_6$ to determine $D_1$. An adder 99 combines the tangents of the angles establishing the dimensions $d_2$ and $d_3$ to obtain the dimension $D_2$. Adder 100 is connected to the fourth and fifth memory units 94 and 95 so that tangents of the mirror angles determining the dimensions $d_4$ and $d_5$ will be added to achieve the workpiece dimension $D_3$.

The units 98, 99, and 100 are termed "adders" and these perform an algebraic addition or subtraction function. From FIG. 1, it will be observed that in order to determine the dimension $D_1$, one needs to add the dimension $d_1$ plus $d_6$. Since the angle determining the dimension $d_6$ is negative, then a subtraction function is actually performed, subtracting a negative number from a positive number, which actually means the algebraic addition of these two partial dimensions. For the dimension $D_2$ of the object 20, it is the difference between the dimensions $d_2$, and $d_3$, both of which are positive numbers, so again this is a subtraction function. For the dimension $D_3$, this is a difference between the partial distances $d_4$ and $d_5$, both of which are negative, so again this is a subtraction function.

Figure 4:
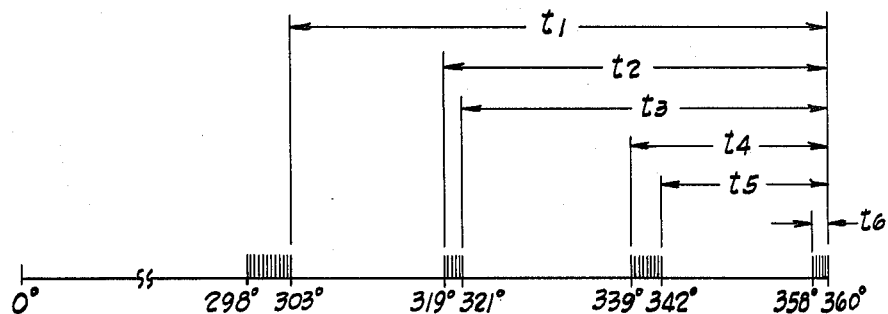
FIG. 4 is a graph of an alternative output signal versus angle of the scanning mirror.

The reference means need not be a reference beam coincident with the parabolic reflector principal axis 17. As shown in the parent application, U.S. Pat. No. 4,201,476, the reference means may be a black bar 107 which would be scanned at some definable position of the mirror, e.g., an angle of 30° relative to the principal axis 17. Such reference means may alternatively be where the beam, reflected by the scannable mirror 15, passes off the outer edge of the parabolic reflector 16. In either case, this establishes non-illumination of the photodetector 31, and this may be used as the reference. FIG. 4 shows such reference, where the mirror is at a 30-degree angle to the parabolic reflector axis 17. In comparison with FIG. 3, it will be noted that the reference 0° point is shifted to the right by this 30-degree difference. In order to compensate for the nonlinearity of the parabolic reflector 16, which is proportional to a tangent function, the microprocessor 36 may be programmed with a tangent table which is displaced 30 degrees. This creates a synthetic tangent table easily stored in the memory of such microprocessor 36.

The first dimension to be scanned, assuming a clockwise rotation of the mirror 15, will be dimension $D_3$. The times $t_1$ and $t_2$ will be stored in the memories 91 and 92, respectively; hence, the circuit of FIG. 5 will be changed so that these two memories will be connected to the adder 100 to display the dimension $D_3$. Times $t_3$ and $t_4$ will determine the dimension $D_1$, and with these times stored in memories 93 and 94, respectively, the memories would have an output to the adder 98 to display this dimension $D_2$. The dimension $D_2$ would be the last to be scanned, just before the reference 360-degree mark and the times $t_5$ and $t_6$ would be stored in the fifth and sixth memories 95 and 96. These memories would have an output to the adder 99 so that the panel 37 would display this dimension $D_2$. It will be seen that in this FIG. 4, the reference means has an offset of 30° relative to the reference axis, which is the principal axis 17 of the parabolic reflector 16.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A light gauge for noncontact measuring of two different dimensions of an object comprising, in combination, a parabolic mirror having a focal point along the principal axis of the mirror, scannable means including means substantially at said focal point mounted to scan said parabolic mirror to cooperate with a plurality of light beams extending from said parabolic mirror parallel to said axis, reflector means having at least part thereof established in front of said parabolic mirror and positioned to establish the light beams in a plurality of groups of paths including at least first and second groups of paths to scan the object to be measured, said at least first and second groups of paths being adjacent and non-overlapping, photodetector means mounted to receive the light beams from said first and second groups of paths after scanning of two different dimensions of any said object, output means connected to receive the output of said photodetector means, means actuated in accordance with said scannable means to determine the position thereof and having an output to said output means, and said output means including means to determine the dimension along two different directions of any object in said groups of paths.

2. A gauge as set forth in claim 1, wherein all of said groups of paths are substantially equal in width.

3. A gauge as set forth in claim 1, wherein said reflector means includes first prism means to reflect the beams of said first group of paths at an angle different from said axis to have the paths scan across any said object.

4. A gauge as set forth in claim 3, wherein said reflector means includes a first retroreflector on a side of any said object opposite said first prism means to reflect the beams of said first group of paths to said prism means and then return to said parabolic mirror.

5. A gauge as set forth in claim 1, wherein said reflector means includes a retroreflector on a side of any said object opposite said parabolic reflector to reflect the beams of said second group of paths to said parabolic reflector.

6. A gauge as set forth in claim 1, wherein said reflector means includes means to establish the light beams in first, second and third groups of paths, with said third group of paths established by said reflector means to scan the object at an angle different from said first and second groups of paths.

7. A gauge as set forth in claim 6, wherein the sum of the width of all groups of paths is substantially equal to all of the reflective space in said parabolic mirror.

8. A gauge as set forth in claim 7, wherein said reflector means includes prism means to reflect the beams of said third group of paths at an angle different from the angles of said first and second groups of paths.

9. A gauge as set forth in claim 8, wherein said reflector means includes retroreflector means on a side of any said object opposite said prism means to reflect the beams of said third group of paths to said prism means and then return to said parabolic mirror.

10. A gauge as set forth in claim 1, wherein said first group of paths has a width sufficient to scan across any said object for dimensional measurement thereof perpendicular to said first group, and said second group of paths has a width sufficient to scan across any said object for dimensional measurement thereof perpendicular to said second group.

* * * * *